Dec. 31, 1968    J. D. PANICCI    3,418,744
FISHING LURE
Filed Jan. 19, 1967
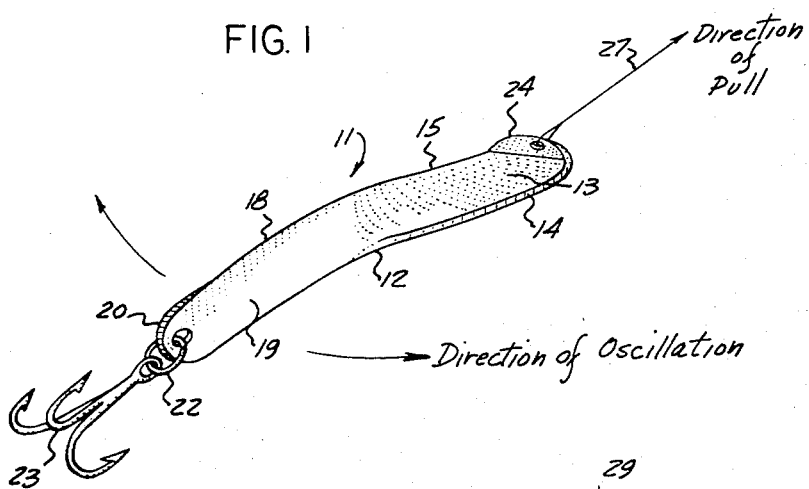
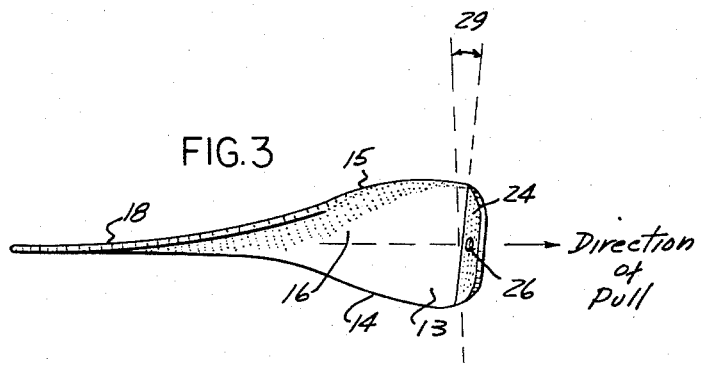
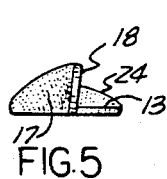
FIG.5
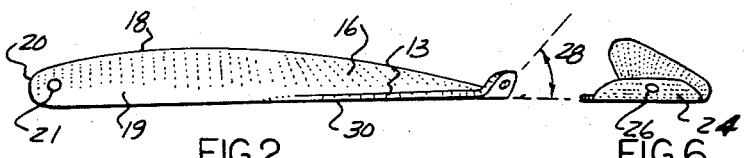
FIG.2
FIG.6
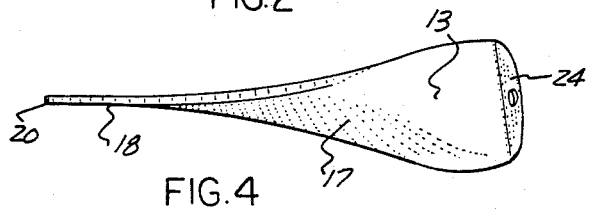
FIG.4
INVENTOR
JOHN D. PANICCI
BY Cullen, Sloman, & Panton
ATTORNEYS

United States Patent Office 3,418,744
Patented Dec. 31, 1968

3,418,744
FISHING LURE
John D. Panicci, 21314 Hamilton,
Farmington, Mich. 48024
Filed Jan. 19, 1967, Ser. No. 610,431
3 Claims. (Cl. 43—42.5)

ABSTRACT OF THE DISCLOSURE

A fishing lure having a body which includes a forward flat horizontal and rearwardly converging body plate terminating at its forward end in a short upwardly and forwardly extending deflector plate centrally apertured to receive the pulling line. The lure is twisted intermediate its ends so that said body plate smoothly merges into upright elongated trailing fin apertured to mount a hook and whose elongated bottom edge smoothly merges with and is coplanar with one of the converging side edges of said body plate, the other rearwardly converging edge of said body plate extending rearwardly and upwardly to smoothly merge with the top edge of said fin. The lure oscillates in a horizontal plane as it is drawn through the water.

---

The present invention relates to a fish lure, and more particularly to an elongated metallic lure of unit construction.

It is an object of the present invention to provide an improved unitary metallic lure which is of such construction as to simulate when drawn through the water by its oscillation in a horizontal plane the movements of a swimming small fish.

It is another object of the present invention to provide a simple unitary lure construction wherein the lure body consists of forwardly arranged body plate terminating in an angular deflector apertured for connection to a fishing line and intermediate its ends is twisted throughout substantially 90° to define and merge smoothly with a trailing upright fin, the construction of the lure body plate and fin and deflector plate being such that the lure when drawn through the water is adapted to oscillate in a horizontal plane about its connection with the drawing line to simulate a swimming fish.

These and other objects will be seen from the following specification and claims in conjunction with the appended drawing in which:

FIG. 1 is a perspective view of the complete lure.
FIG. 2 is a side elevational view thereof.
FIG. 3 is a plan view thereof.
FIG. 4 is a bottom plan view thereof.
FIG. 5 is a rear elevational view thereof.
FIG. 6 is a front end elevational view thereof.

Referring to the drawing the present unitary lure is constructed of a preferably metallic body, such as brass or copper, for illustration, generally indicated at 11 said lure including unit body 12 which includes the flat forwardly projected horizontally disposed body plate 13.

Said body plate is defined by the opposing rearwardly and inwardly curved side edges 14 and 15.

The said body 12 is twisted throughout approximately 90° intermediate its ends so that the said body plate 13 terminates in the upright rearwardly extending fin 18 including the opposed upright side flat walls 19.

The fin is rounded at 20 at its rear end into substantially a teardrop shape and is apertured as at 21 to receive the metallic loop or other fastener 22 which swivelly and loosely mounts the trailing gang hook 23.

One side edge of the flat body plate 13, namely, the edge 14 as it curves rearwardly and inwardly merges with the bottom edge of the upright fin 18 and as shown in FIG. 2 is coplanar therewith so that the entire bottom surface of the lure lies in a single horizontal plane.

The opposite rearwardly and inwardly curved edge 15 of body plate 13 curves inwardly and upwardly due to the central twisted portion of the body so as to merge with the top edge of the fin which at its rear edge is perfectly upright and gradually towards its forward portion is so curved taking into consideration the concave top curved surface 16 and the convex undersurface 17, FIGS. 4 and 5, so that there is a smooth merging of the flat body plate 13 and the substantially upright fin 18 due to the twisting action of the unit body in its construction. Thus edge 15 as it merges with said fin forms a continuous upwardly convex edge which extends substantially from the forward end of the body plate to the rear end of said fin, when viewed in side elevation.

The forward end portion of the flat body plate terminates in the upwardly and forwardly extending short deflector plate 24, which as shown at 28, FIG. 2 extends upwardly at an acute angle to the horizontal in excess of 45° approximately and is centrally apertured as at 26, adapted to receive the pulling line or fishing line 27.

In addition to the deflector 24 lying in an angular plane as best shown in FIGS. 2 and 3, the said deflector is also lying in additional angular plane arranged in a small acute angle of a few degrees, approximately 10°, for illustration, as shown at 29, FIG. 3 with respect to a line or plane transverse to the longitudinal axis of the lure body, FIG. 3.

It is this combination of angular planes in the formation of the deflector plate 24 at the forward end of the lure body and the arrangement of the aperture 26 and connection to the pulling line 27 which provides for oscillation of the lure body in a horizontal plane as shown in FIG. 1, about a vertical axis which extends through aperture 26 to thus simulate the movement of a swimming fish and thus be more effective as a fishing lure.

It is noted that deflector plate 24 is of a small height considerably less than the height of fin 18 and thus there is no turbulence as the lure is drawn through the water nor is there any twisting action of the lure body as is often characteristic with many lures.

The present lure construction is unusual and in combining the structural portions of the lure body including the horizontally disposed flat plate 13 and its angular deflector plate 24 and in conjunction with the upwardly twisted elongated trailing fin 18 provides an unusual lure construction and an unusual action which is essentially an oscillation of the lure about its pivot axis through aperture 26 as the lure is drawn through the water to render the same highly attractive and efficient for the intended purpose.

In addition to the oscillation achieved the lure appears to have the additional characteristic of as a unit travelling laterally from one side of a plane vertically through the pulling line 27 to the other side of said plane as the lure is drawn through the water, at the same time maintaining a continuous limited horizontal oscillation about the vertical axis 26.

Having described my invention reference should now be had to the following claims.

I claim:
1. A fish lure comprising a metallic body including a flat forwardly projected horizontally disposed body plate;
   a deflector plate at its forward end extending forwardly and upwardly at an acute angle to the horizontal;
   there being a central aperture in said deflector plate substantially along said longitudinal axis adapted to receive a line;
   an elongated substantially upright fin extending from the rear end portion of said body plate;

said body intermediate its ends being twisted throughout substantially 90° so that said body plate smoothly merges into said fin;

the sides of said body plate adjacent said deflector plate converging rearwardly, with one side of said body plate merging with thhe bottom edge of said fin and coplanar therewith;

the other side of said body plate extending rearwardly and upwardly to smoothly merge with the top edge of said fin and forms therewith a continuous upwardly convex edge extending substantially from the forward end of said body plate to the rear end of said fin, when viewed in side elevation;

said body on movement through the water adapted to oscillate in a horizontal plane about a vertical axis extending through said deflector plate aperture to simulate a swimming fish.

2. In the lure of claim 1, said deflector plate being of a height less than the height of said fin.

3. In the lure of claim 1, said fin being rounded and of teardrop shape at its rear end, and having a transverse central aperture adapted to flexibly mount a trailing gang hook.

References Cited

UNITED STATES PATENTS

| | | | |
|---|---|---|---|
| 1,317,890 | 10/1919 | Patton | 43—42.51 |
| 1,809,663 | 6/1931 | Allen | 43—42.5 |
| 2,256,346 | 9/1941 | Mathie | 43—42.52 X |
| 2,667,007 | 1/1954 | Heron | 43—42.5 |
| 2,805,512 | 9/1957 | Bunce | 43—42.18 |
| 3,056,228 | 10/1962 | Stackhouse | 43—42.51 |

SAMUEL KOREN, *Primary Examiner.*